United States Patent [19]

Borchert

[11] Patent Number: 4,688,630
[45] Date of Patent: Aug. 25, 1987

[54] APPARATUS FOR RETRIEVING SPHERICALLY SHAPED CLEANSING BODIES

[75] Inventor: Werner Borchert, Mülheim, Fed. Rep. of Germany

[73] Assignee: GEA Energiesystemtechnik GmbH & Co., Bochum, Fed. Rep. of Germany

[21] Appl. No.: 945,058

[22] PCT Filed: Mar. 6, 1986

[86] PCT No.: PCT/EP86/00117
§ 371 Date: Nov. 21, 1986
§ 102(e) Date: Nov. 21, 1986

[87] PCT Pub. No.: WO86/06822
PCT Pub. Date: Nov. 20, 1986

[30] Foreign Application Priority Data

May 3, 1985 [EP] European Pat. Off. ........... 85200702

[51] Int. Cl.⁴ .............................................. F28G 1/12
[52] U.S. Cl. ...................................... 165/95; 15/3.51; 15/104.06 A
[58] Field of Search ................. 122/379; 15/104.06 A, 15/3.51; 165/95

[56] References Cited

U.S. PATENT DOCUMENTS

| | | | |
|---|---|---|---|
| 3,303,525 | 2/1967 | Peoples et al. | 15/104.06 A |
| 4,447,925 | 5/1984 | Riedel | 15/104.06 A |
| 4,544,027 | 10/1985 | Goldberg et al. | 165/95 |
| 4,566,533 | 1/1986 | Buchinski et al. | 165/95 |
| 4,578,838 | 4/1986 | Prinz | 165/95 X |
| 4,620,589 | 11/1986 | Koller | 165/95 |

Primary Examiner—Edward G. Favors
Attorney, Agent, or Firm—Townsend & Townsend

[57] ABSTRACT

An apparatus (8) is provided for retrieving spherically shaped cleansing bodies circulated through the cooling system of a tubular heat exchanger. It has a cylindrical housing (11) into which feed and discharge tubes (6,9) and associated extensions (14,15) reach. To achieve simplified operation, valve plates (20,21) are mounted on a central shaft (18) to form a seal flush against the angularly inclined ends of pipe extensions (14,15) by appropriately rotating shaft (18). Further a sieve plate (24) is fixedly mounted in housing (11) perpendicular to shaft (18). Shaft (18) may be rotated through 180° and has three operative settings. In a first, control setting extensions (14,15) and cutout (25) are closed, in a second, flow-through setting all three are open, and in a third, retrieval setting extensions (14,15) remain open while cutout opening (25) is closed.

8 Claims, 7 Drawing Figures

4,688,630

APPARATUS FOR RETRIEVING SPHERICALLY SHAPED CLEANSING BODIES

BACKGROUND OF THE INVENTION

The invention relates to a device for retrieving foam rubber, spherically shaped cleansing bodies which are circulated through the cooling system of a tubular heat exchanger or the like. The device has a sieve mounted inside a cylindrical housing, feed and discharge tubes, and valves for opening and closing the tubes.

It is conventional to clean the pipes of a water-cooled, tubular heat exchanger with spherically shaped cleansing bodies. They are made of foam rubber, or a similar material, have a diameter slightly larger than the inner diameter of the pipes, are pumped into the cooling water, and are subsequently forced through the pipes. After the cleansing bodies have passed the heat exchanger, they are retrieved from the cooling water by means of a filtration device and reintroduced into cooling water which flows toward the heat exchanger. Due to friction the cleansing bodies are subject to wear and abrasion. As their diameter decreases they must be removed from circulation and replaced.

Japanese Pat. No. 47 22765 accomplishes they by incorporating a sieve-like interceptor apparatus in the system. Such an interceptor has a filter sieve and a chamber directly beneath it. To each a discharge tube and associated valve mechanism are attached. The interceptor can be operated to allow the cooling water and the cleansing bodies entrained therein to circulate the bodies through the pipes during normal cleaning and to divert the bodies so that they are trapped by the sieve and retained in the interceptor. Trapped cleansing bodies in the sieve are removed and sorted, and those with excessively reduced diameters are replaced. In this arrangement the cleansing bodies are separated from the cooling water by carrying them in a flow of water through a pump, located upstream of the filter device, from the sieve past the interceptor and through one of the discharge tubes back into the cooling water pipes located upstream of the heat exchanger. This requires three valves which must be controlled and operated to open and close so that water can pass through, or cleansing bodies can be retrieved and inspected. Generally this requires complex, costly electronic controls and a corresponding number of actuating motors. Additionally, the typically used ball valves wear out quickly and thereby lose their seal.

Similar drawbacks are encountered with the retrieval device described in the German Pat. No. 32 27 708. It employs a conical sieve basket and a valve at the lower end thereof which alternately connects the outlet of the sieve basket, or a chamber located directly beneath it, with a discharge tube which, on the outside of the chamber, leads to a shut-off valve.

SUMMARY OF THE INVENTION

An object of the present invention is therefore to provide a retrieval device of the present kind, having feed and discharge tubes, which can be operated and controlled to open and close in a more simple manner, and in which a more effective sealing of the valves is achieved.

This objective is realized in accordance with the present invention by extending the feed and discharge tubes into the chamber; by mounting valve members to a central shaft so that they can close the tubes extending into the chamber, and a sieve plate fixedly mounting to the shaft and perpendicular thereto. The sieve has a sectoral cutout that may be opened and closed by a rotatable valve disk attached to the shaft.

The advantage of the present embodiment is that only one control device is needed for opening and closing the feed and discharge tubes. This significantly reduces the costs of electrical controls. The valve plates or discs are positioned at right angels to the tube openings which eliminates sliding motions during closure and thereby establishes a particularly effective seal. A further advantage is that instead of the typically complex, conventional sieve or filter basket, a simple sieve plate is provided with a sectoral cutout that may be closed by a rotary valve disc, also actuated by the central shaft.

The retrieval apparatus has three operational settings which are determined by three operative positions of the central shaft. In a control setting both feed and discharge tubes as well as the rotary valve disk are closed. This permits the viewing of the contents of the retrieval chamber through a monitoring tube, a cover or the like. The flow-through setting, when the cleansing bodies pass through the chamber, both the feed and discharge tubes and the sectoral cutout in the sieve plate are open. In the retrieval setting the feed and discharge tubes are opened, while the rotary valve disk closes the cutout in the sieve. This allows water to flow through the sealed cutout while trapping the cleansing bodies on the sieve plate.

A particularly tight seal between the valve plates and the ends of the tubes is achieved by orienting the sealing surfaces at an angle of preferably 45° relative to their longitudinal axes, with both sealing surfaces facing in the same direction of rotation. Further each valve plate is preferably mounted to a rotor arm affixed to the central shaft in such a way that the valve disks securely engage the sealing surfaces of the associated tube ends when the shaft is in a predetermined rotational position. Both the tube ends and the associated valve disks are positioned diametrically opposite one another in the chamber or on the central shaft, respectively.

The opening in the sieve plate is defined by a sector-like cut-out which extends over approximately a fourth of the plate's circumference. The rotary valve disk is semicircular and has a secant that is parallel to the valve plates. Accordingly, the rotary valve disk is mounted to the central shaft for rotation therewith parallel to the sieve plate. When it is rotated the sieve plate is cleaned as well. A servomotor is provided which rotationally moves the central shaft into the three operational settings.

An embodiment of the invention is shown in the drawings as follows:

DESCRIPTION OF THE PREFERRED EMBODIMENTS

Figure 1:
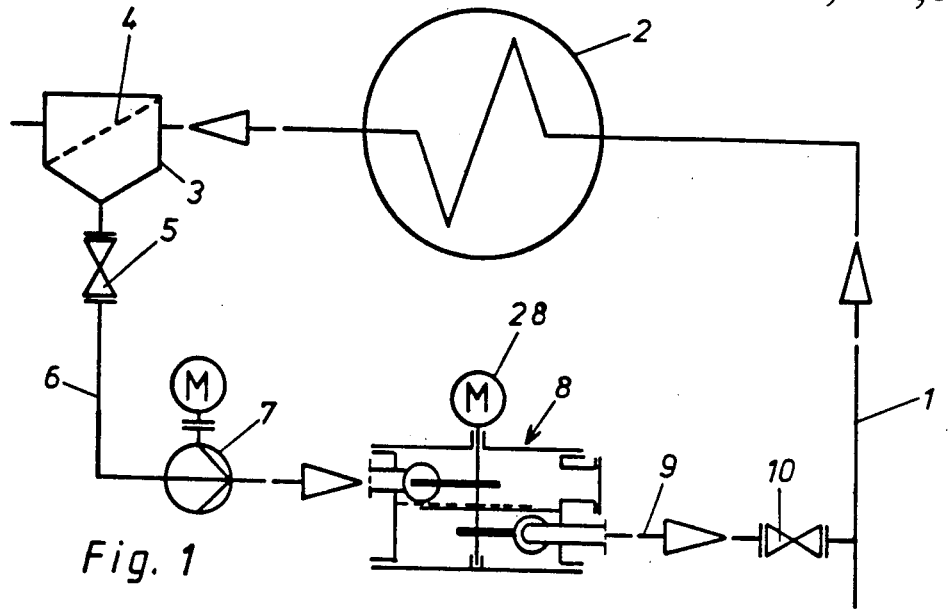
FIG. 1 schematically illustrates a system for introducing spherically shaped cleansing bodies into and retrieving them from the cooling water system of a tubular heat exchanger.

As shown in FIG. 1, cooling water is pumped by way of a cooling conduit 1 comprised of cooling pipes through a tubular heat exchanger 2. To clean the pipes of heat exchanger 2, flexibly elastic, spherically shaped cleansing bodies, made of rubber or plastic and having a diameter somewhat larger than the inner diameter of the cooling pipes, are pumped into the cooling water at timed intervals and forced through the pipes. After leaving heat exchanger 2 the cleansing bodies are removed from the main flow of cooling water by a filter 3 and recirculated into the main cooling water flow via a piping system. Cleansing bodies removed from the cooling water by a sieve 4 of filter 3, together with a minor amount of water, are fed by means of a pump 7 through a feed tube 6, a valve 5 and into a retrieval device 8. The cleansing bodies pass through device 8 when it is in its flow-through setting and are reintroduced into the cooling conduit 1 by way of discharge tube 9 and a valve 10.

Figure 2:
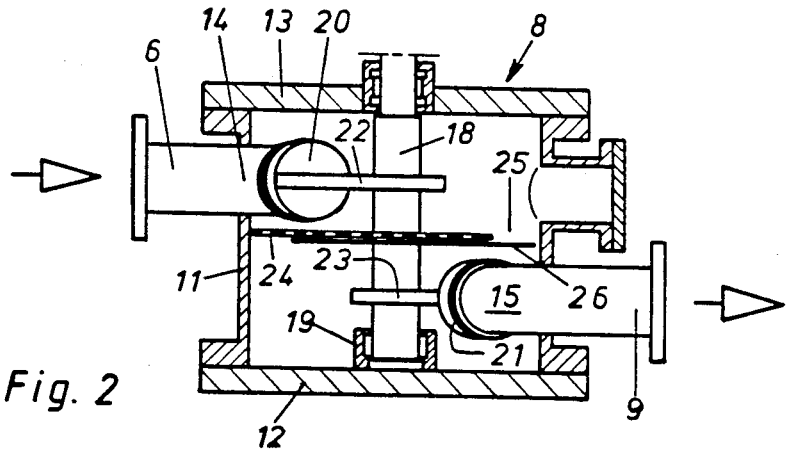
FIG. 2 is a longitudinal view, in cross-section, of the retrieval device which forms part of the system of FIG. 1 in its control setting.
Figure 3:
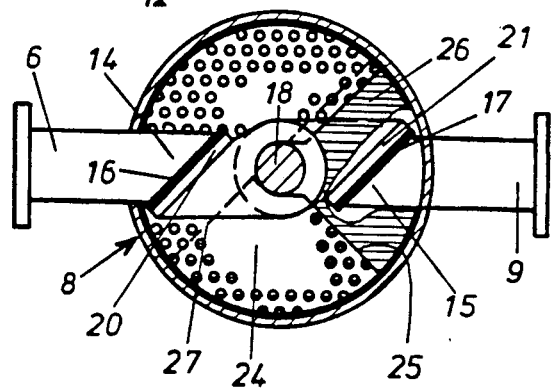
FIG. 3 is a cross-sectional plan view of the device of FIG. 2.

Referring to FIGS. 2 and 3, retrieval device 8 comprises a cylindrical housing 11 having a bottom plate 12 and a cover 13. An extension 14 of feed tube 6 extends radially into an upper section of housing 11. Diametrically opposite thereto is extension 15 of discharge tube 9 in a lower section of housing 11. The ends of both extensions 14,15 form sealing surfaces 16,17 which are inclined by approximately 45° relative to the longitudinal axes of the pipe extensions. Both surfaces 16,17 and the openings of pipe extensions 14,15 face in the same counterclockwise direction of rotation as is shown in FIG. 3.

Cylindrical chamber 11 includes a central shaft 18 mounted inside an end bearing 19 on bottom plate 12. Mounted on shaft 18 diametrically opposite each other are rotor arms 22, 23 the ends of which carry valve plates 20,21 oriented so that they form, as shown in FIGS. 2 and 3, a tight seal with sealing surfaces 16,17 on pipe extensions 14,15. Valve plates 20,21 and sealing surfaces 16,17 include suitable gaskets or seal rings. As shown in FIG. 3, shaft 18 is in its closed position when it is rotated clockwise into its extreme righthand position.

In addition, a sieve plate 24 is mounted in chamber 11 at an elevation midway between pipe extensions 14,15. The sieve has a sectoral cutout extending over about a quarter of its circumference. A central opening is provided in sieve plate 24 through which central shaft 18 extends. The cutout 25 can be opened and closed with a rotary, semicircular valve disk 26 secured to shaft 18 and having a secant 27 that is parallel to valve plates 20,21. Rotary valve disk 26 is mounted to shaft 18 just below and parallel to sieve plate 24.

When shaft 18 is rotated approximately 180° counterclockwise from its position in FIGS. 2 and 3, pipe extensions 14,15 are open and rotary valve disk 26 opens cutout 25. The resulting flow-through setting allows the spherically shaped cleansing bodies to be fed through tubular heat exchanger 2, thereby continuously cleansing the entire pipe system. In this setting the cleansing bodies flow freely through cutout 25.

Figure 6:
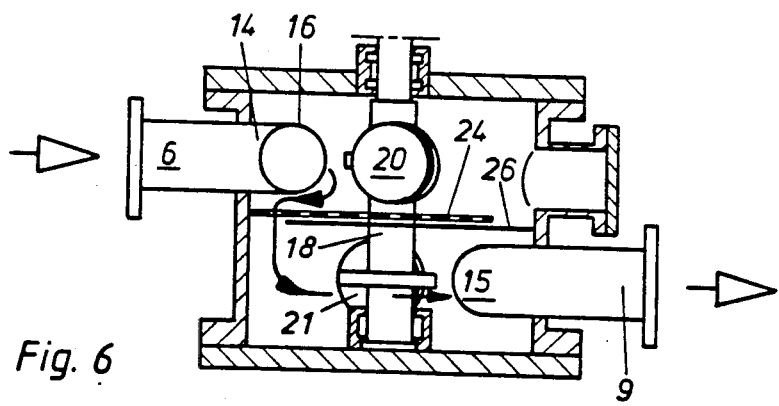
FIG. 6 shows the device of FIG. 2 in its retrieval setting.
Figure 7:
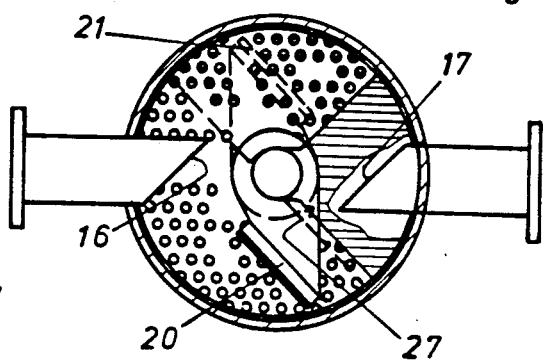
FIG. 7 is a cross-section of the device of FIG. 6.

When the cleansing bodies are to be retrieved in device 8, central shaft 18 is rotated 90° clockwise from its flow-through setting, thereby closing cutout 25 with one-half of valve disk 26 as shown in FIGS. 6 and 7. While water continues to flow freely through sieve plate 24, the cleansing bodies are trapped by it and they collect in a space above the sieve.

When all cleansing bodies are trapped, shaft 18 may be rotated 90° clockwise into its control setting shown in FIGS. 2 and 3. Alternatively, it can be rotated 90° counter-clockwise into its flow-through setting shown in FIGS. 3 and 4. Shaft 18 is moved into its three operative settings by a servomotor 28 which may be connected to a suitably programmed control unit.

Figure 4:
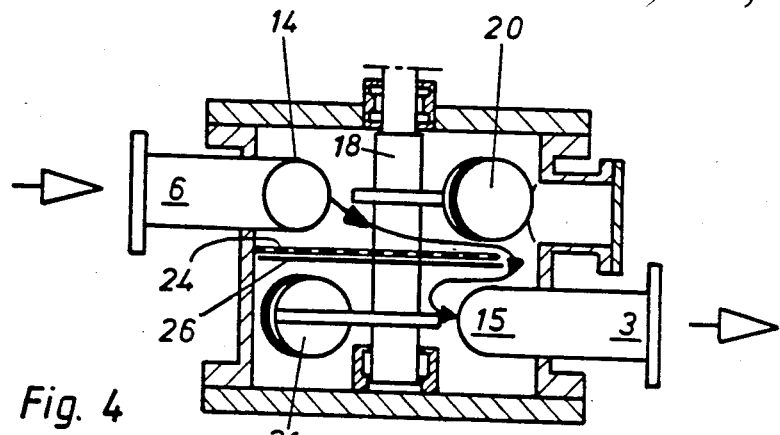
FIG. 4 shows the device of FIG. 2 in the flow-through setting.
Figure 5:
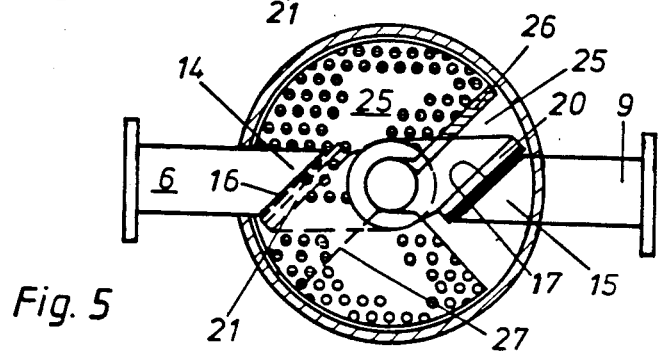
FIG. 5 is a cross-sectional plan of the device of FIG. 4.

From the foregoing operational description of the present invention it is clear that the semicircular rotary valve disk exposes cutout 25 only in the flow-through setting, when shaft 18 is rotated counterclockwise to the extreme left, as shown in FIGS. 4 and 5. In the remaining two settings, on the other hand, cutout 25 remains closed.

What is claimed is:

1. Apparatus for retrieving generally spherically shaped cleansing bodies circulating with cooling water in a flow circuit including a tubular heat exchanger, the apparatus comprising a generally cylindrical housing, a feed tube extending into the housing and a discharge tube extending into the housing, ends of the tubes being positioned interiorly of the housing, a rotatable, central shaft mounted to the housing and carrying valve members positioned so that upon rotation the members lie flat against the ends of the tubes and thereby seal the tubes, a sieve plate affixed to the housing and positioned axially intermediate the tube ends, the sieve plate being perpendicular to the shaft and including a cutout, and a rotary valve disk attached to the shaft so that, upon rotational movement of the shaft, the rotary valve disk opens and closes the sieve plate cutout.

2. Apparatus according to claim 1 wherein the ends of the tubes extending into the housing are inclined by about 45° relative to longitudinal axes of the tubes, the ends of the tubes facing in the same direction of rotation.

3. Apparatus according to claim 2 including rotor arms affixed to shaft 18 and wherein the valve members are defined by valve plates affixed to free ends of the rotor arms, the valve plates being positioned on the arms so that when the shaft is moved into a predetermined rotational position, the valve plates form a tight seal against inclined sealing surfaces defined by the tube ends.

4. Apparatus according to claim 2 wherein the tubes and the associated valves are mounted diametrically opposite to each other in the housing and on the shaft, respectfully.

5. Apparatus according to claim 1 wherein the cutout in the sieve plate is a sectoral cutout extending over about one-quarter of a circumference of the filter plate, and wherein the rotary valve disk has a generally semicircular configuration and a secant which is parallel to the valve plates.

6. Apparatus according to claim 5 wherein the rotary valve disk is secured to the shaft and is rotatable therewith parallel to the sieve plate.

7. Apparatus according to claim 1 including a servo motor for actuating the shaft.

8. Apparatus for retrieving cleansing bodies circulating with cooling water through a piping system including a tubular heat exchanger, the apparatus comprising a tubular housing having a longitudinal axis; a sieve disposed within and affixed to the housing and dividing the housing into first and second chambers; a feed tube extending in a radial direction through the housing into the first chamber; a discharge tube positioned diametrically opposite from the feed tube and extending through the housing into the second chamber; a central shaft mounted axially relative to the housing for rotation therein; first and second valve plates mounted to the shaft diametrically opposite from each other; the tube ends in the sections defining sealing surfaces which are inclined relative to axes of the respective tubes and which face in like directions of rotations, and the valve plates having sealing surfaces shaped and positioned to sealingly engage the sealing surfaces on the tube ends when the shaft is in a predetermined rotational position; the sieve plate including a cutout of sufficient size to permit passage of cleansing bodies between the first and second chambers; and a rotary valve disk fixedly attached to the shaft for rotation therewith in a plane parallel and closely adjacent to the sieve plate, the rotary valve disk having a shape so that it overlies the sieve plate cutout and thereby prevents the passage of cleansing bodies between the first and second chambers when, in a first position, the valve plates are spaced from the sealing surfaces of the tubes, so as to permit a flow of liquids through the tube and the housing, and in a second rotational position of the shaft, when the valve plates close the tube ends and prevent a flow of liquid through the tubes and the housing, and so that, in a third position, the rotary valve disk opens the sieve plate cutout and thereby permits the passage of cleansing bodies between the first and second housing sections when the valve plates are spaced from the corresponding ends of the tubes and water as well as cleansing bodies flow through the tubes, past the first and second housing sections, and through the sieve plate cutout.

* * * * *